US010214711B2

(12) United States Patent
Marriott

(10) Patent No.: US 10,214,711 B2
(45) Date of Patent: Feb. 26, 2019

(54) FRACTIONATION OF HOP OILS USING LIQUID AND SUPERCRITICAL CARBON DIOXIDE

(71) Applicant: Totally Natural Solutions Ltd, Kent (GB)

(72) Inventor: Raymond Marriott, Northamptonshire (GB)

(73) Assignee: TOTALLY NATURAL SOLUTIONS LTD., Kent (GB)

( * ) Notice: Subject to any disclaimer, the term of this patent is extended or adjusted under 35 U.S.C. 154(b) by 0 days.

(21) Appl. No.: 15/028,534

(22) PCT Filed: Oct. 23, 2014

(86) PCT No.: PCT/EP2014/025009
§ 371 (c)(1),
(2) Date: Apr. 11, 2016

(87) PCT Pub. No.: WO2015/062745
PCT Pub. Date: May 7, 2015

(65) Prior Publication Data
US 2016/0298064 A1    Oct. 13, 2016

(30) Foreign Application Priority Data

Oct. 28, 2013  (EP) .................................... 13190555
May 20, 2014  (EP) .................................... 14169159

(51) Int. Cl.
  *C12C 3/10*    (2006.01)
  *C12C 3/08*    (2006.01)

(52) U.S. Cl.
CPC . *C12C 3/08* (2013.01); *C12C 3/10* (2013.01)

(58) Field of Classification Search
CPC .... C12C 3/10; C12C 3/08; C12C 3/12; C12C 5/026; C12C 9/025; C12C 5/00; C12C 7/20; C12C 11/003; C12C 3/00; C12C 5/02; C12C 7/287; A23V 2250/21; A23V 2300/02; A23V 2300/14; A23V 2300/44;
(Continued)

(56) References Cited

U.S. PATENT DOCUMENTS 3,433,642 A    3/1969  Nakayama
4,507,329 A *  3/1985  Grant ........................ C12C 3/10
                                                    426/16
(Continued)

FOREIGN PATENT DOCUMENTS

EP    0019462    11/1980
EP    0679419    11/1995
(Continued)

OTHER PUBLICATIONS

Caude, Marcel and Thiebaut Didier, Practial Supercritical Fluid Chromatography, Hardwood Academic Publishers, 1999, p. 314.*
(Continued)

*Primary Examiner* — Hong T Yoo
(74) *Attorney, Agent, or Firm* — RatnerPrestia

(57) ABSTRACT

This invention discloses a method for producing of hop aroma from hop oil that uses only carbon dioxide and ethanol as solvents. It also covers 'green' aromas produced by that method and the beers produced using these 'green' aromas.

8 Claims, 17 Drawing Sheets

FIGURE 1

(58) Field of Classification Search
CPC ............ B01D 11/0203; B01D 11/0407; B01D 11/0288; B01D 11/0292
See application file for complete search history.

(56) References Cited

U.S. PATENT DOCUMENTS

| | | | | |
|---|---|---|---|---|
| 5,015,491 | A | * | 5/1991 | Westwood ................ C12C 3/12 426/600 |
| 5,061,502 | A | * | 10/1991 | Cully ...................... C11B 9/022 210/673 |
| 5,264,236 | A | * | 11/1993 | Ogasahara ......... B01D 11/0203 426/600 |
| 2003/0138546 | A1 | | 7/2003 | Goldstein |
| 2010/0151107 | A1 | | 6/2010 | Nookandeh-Baumgartner |

FOREIGN PATENT DOCUMENTS

| | | |
|---|---|---|
| EP | 1920777 | 5/2008 |
| WO | 9925807 | 5/1999 |

OTHER PUBLICATIONS

Caude, Marcel and Didier Thiebaut, Practical Supercritical Fluid Chromatography and Extraction, Harwood Academic Publishers, 1999, pp. 314 (Year: 1999).*

Goiris, K., et al., "The oxygenated sesquiterpeniod fraction of hops in relation to the spicy hop character of beer," May 16, 2002, pp. 86-93, vol. 108(1), Journal of the Institute of Brewing.

International Search Report for International Application No. PCT/EP2014/025009 dated Feb. 12, 2015.

Moir, M., "Hops—A millennium review," 2000, pp. 131-146, vol. 58(4), Journal of the American Society of Brewing Chemists (abstract only).

Written Opinion of the International Searching Authority for International Application No. PCT/EP2014/025009 dated Feb. 12, 2015.

* cited by examiner

FRACTIONATION OF HOP OILS USING LIQUID AND SUPERCRITICAL CARBON DIOXIDE

CROSS-REFERENCE TO RELATED APPLICATIONS

This application is a U.S. National Stage application, claiming priority under 35 U.S.C. §§ 120 and 371 to PCT International Application No. PCT/EP2014/025009, filed Oct. 23, 2014, which claims priority to European Patent Application No. EP 13190555.6, filed Oct. 28, 2013, and European Patent Application No. EP 14169159.2, filed May 20, 2014.

FIELD OF THE INVENTION

This invention discloses a method for producing of hop aroma from hop oil that uses only carbon dioxide and ethanol as solvents. It also covers 'green' aromas produced by that method and the beers produced using these 'green' aromas.

BRIEF DESCRIPTION OF THE PRIOR ART

Hops provide both bitterness and aroma for brewed products as well as soft drinks and other foods. In the last 20 years there has been an increasing trend to separate the aroma fraction from the bitterness so that products can be formulated by independent addition of aroma or bitterness products. This has also resulted in increased use of products that can be added post-fermentation to allow product differentiation from a high gravity brewing line.

Hop oils were the first products to be used to provide independent aroma addition and these were originally prepared by steam distillation of fresh hops. Hop oil No 1 is one of the original Pauls and Whites hop oil products. Hop oil was mostly used to impart "dry hop" character and was added to casks or conditioning tanks via a dropper bottle. Later hop oils were prepared as emulsions using either gums or polysorbates as emulsifiers to simplify the addition of the oils and to aid dispersion as disclosed for example in Moir (Moir M.; in Journal of the American Society of Brewing Chemists 58, 4, 131, 2000)

A number of soluble hop aromas were developed by BRI in 1980: they concluded that a "Spicy" fraction and a "Floral" fraction were capable of delivering almost all hoppy character when used in varying combinations, as described for example in Murray et al. (Murray J. P., Westwood K., and Daoud I. in Proceedings of the European Brewery Convention. IRL Press, Oxford University Press, U.K., 321, 1987). A citrussy fraction and an ester fraction were then added by English Hop Products Ltd as disclosed by Marriott et al. (Marriott R. J., Gardner D. S. J., Fincher M., Kemp T. in Proceedings of the 25th Convention of the Institute of brewing-Asia pacific Section, 1998, 199).

A wider range of soluble hop aromas was recently produced by Botanix Ltd and Kalsec which include specific aroma fractions and soluble hop topnotes produced from specific hop varieties. These are all soluble products designed to be added to bright beer post fermentation and offer the greatest flexibility for brewers.

These products are all derived from hops and start with extracts but use a range of solvent processes to achieve firstly separation of the terpene hydrocarbons from the oxygenated fraction and subsequently fractionation of the oxygenated fraction to produce distinct aroma characteristics. Of these fractions the floral and spicy fractions are the most widely used.

A wide range of natural flavour preparations is already available, including essential oils, herb and spice extracts, flavour molecules fractionated from essential oils or botanical extracts and natural flavour molecules produced by fermentation. The technologies used to produce these traditional products are well established but use methods that are often energy intensive or solvents that are produced from fossil fuels and need to be tightly controlled with respect to residual levels. The largest volumes of extracts used for food flavouring is herb and spice oleoresins. These are mostly extracted at source using a range of organic sol vents such as hexane and acetone. Current EU legislation defines both permitted extraction solvents for flavouring preparations and their maximum residue levels in foodstuff. Additional restrictions are prescribed by the organic certification bodies: none of these have been harmonised.

Organic certification only allows water, carbon dioxide and ethanol as they are safe solvents and only use renewable feedstock. In addition, they have the widest acceptability. Both liquid carbon dioxide and supercritical carbon dioxide have been used as process solvents. Supercritical carbon dioxide is also known as an extraction solvent in the food industry. It has however not been used extensively because of its high installation cost, high operating cost, and requirement for technically skilled operators.

Processes that either reduce or eliminate the use of volatile organic compounds (VOC) can be described as "green" and in that sense, the use of supercritical carbon dioxide in extraction science is considered as 'green' as it acts both in reducing and replacing VOCs.

Hop oil is presently produced using green techniques, but there is still a need to provide green techniques for the subsequent fractionation process.

SUMMARY OF THE INVENTION

It is an objective of the present invention to fractionate hop oil using a strictly 'green' process.

It is another objective of the present invention to use carbon dioxide both as liquid and as supercritical carbon dioxide as solvent in the fractionation of hop oil.

It is also an objective of the present invention to prepare flavours completely free of solvent residues.

It is yet another objective of the present invention to produce beers using 'green' and solvent free flavours.

The foregoing objectives have been realised as described in the independent claims. Preferred embodiments are described in the dependent claims.

DETAILED DESCRIPTION OF THE INVENTION

Figure 1:
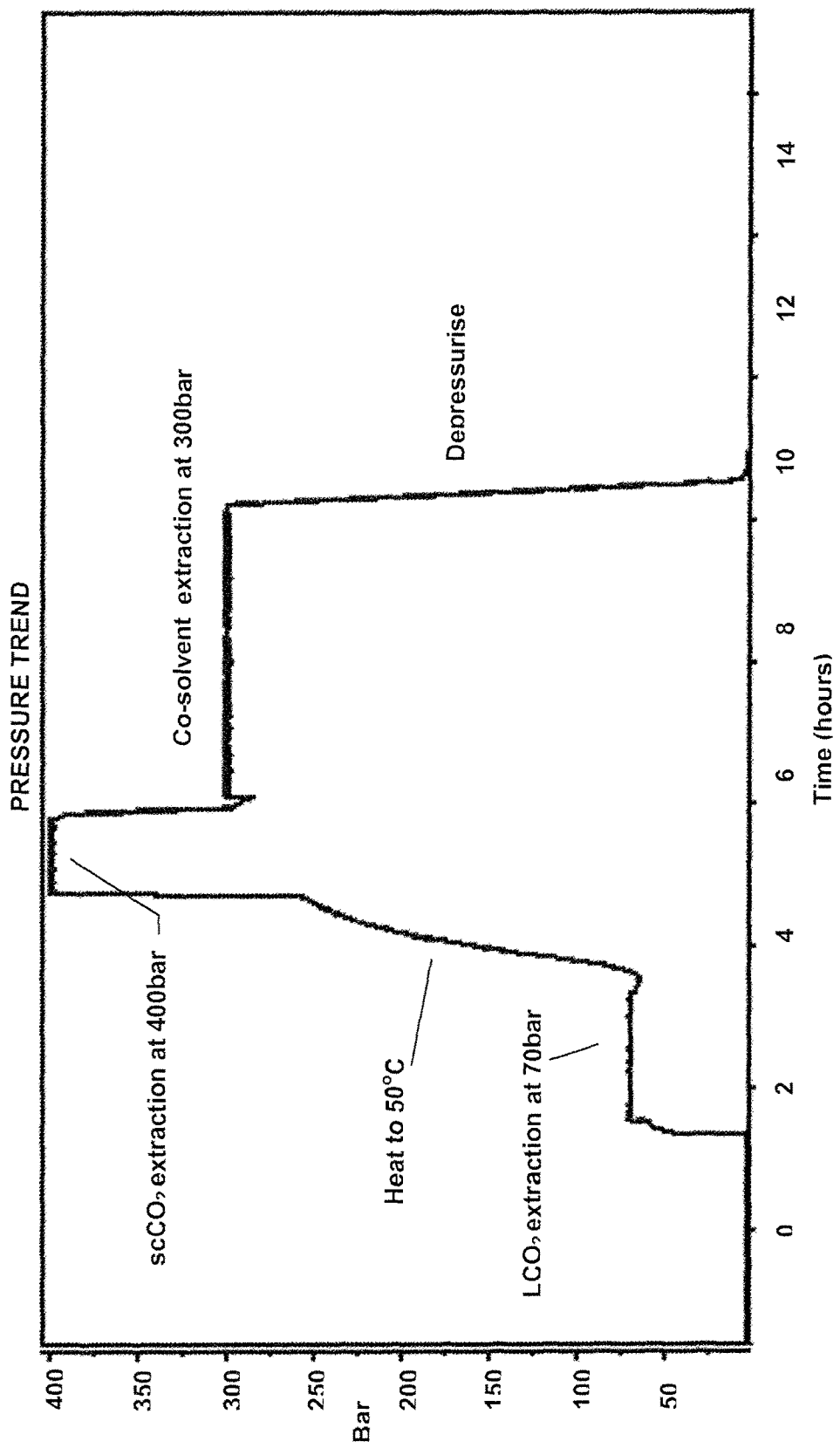
FIG. 1 represents a typical separation profile representing the pressure expressed in bars as a function of time expressed in hours. The temperature is indicated along the lines.

Accordingly, the present invention discloses a method for extracting two or more fractions from hop oil, said method comprising the steps of:
a) providing an inert adsorbing support;
b) loading the hop oil onto the support of step a) at a loading rate ranging between 1 and 70 mass %;
c) separating a first fraction with liquid carbon dioxide at a first temperature ranging between 0° C. and 30° C. and a first pressure ranging between 40 bars and 72.8 bars and a first flow rate ranging between 1 g and 400 g/kg supported material/min until complete or partial separation is achieved;
d) separating a second fraction with supercritical carbon dioxide at a second temperature ranging between 31° C. and 80° C. and a second pressure of at least 72.8 bars and a second flow rate ranging between 1 g and 400 g/kg supported material/min until complete or partial separation is achieved;
e) optionally, continuing the separation process with supercritical carbon dioxide at another set of temperature and pressure until all desired fractions are separated;
f) separating a further fraction as in step d) or e) if it was partially separated, and/or a new fraction with supercritical carbon dioxide at a temperature of at least 31° C. and a pressure of at least 72.8 bars and a flow rate ranging between 1 g and 400 g/kg supported material/ min using a co-solvent at a level ranging between 0.05 vol % and 100 vol % of the CO2 flowrate until complete or partial separation is achieved g) optionally, continuing the separation process with supercritical carbon dioxide at another set of temperature and pressure and co-solvent until all desired fractions are separated;
h) soaking the support resulting from step f) or of step g) in a 'green' solvent;
i) decanting or filtering the 'green' solvent from the support and subsequently evaporating or distilling said solvent;
j) retrieving the remaining unseparated residues said method being characterised in that the fractionation of the hop oil is achieved without going through the intermediate 10-fold hop oil stage.

In other embodiments according to the present invention, any one of step c) or step d) or step f) can be omitted.

The inert adsorbing supports that can be used in the present invention can be either neutral, or basic or acidic and can be selected from any support material known in the art, but they must be inert towards the components of hop oil. They can for example be glass beads, but preferably they have a large surface area and therefore are provided in a finely grinded form or in a porous form.

The support can be selected from any porous material. It is typically selected from silica, alumina, montmonrillionite, magnesium silicate, aluminium silicate, zeolite, polystyrene beads, chitosan, polysaccharides. Suitable support material can for example be selected from Celite S®, Celite 1 10®, Celite 209®, Celite 281®, Celite 503®, Celite 512M®, Celite 545®, Celite 545AW®, Celite 560®, Celite 577F®, Celite 535® all produced by Celite Corp., acid Alumina (Alumina A), basic Alumina (Alumina B), neutral Alumina (Alumina N), Ascarite® and Florisil® both produced by Sigma-Aldrich, Bentonite, Kaolinite, Fuller's Earth, produced by Sigma-Aldrich, silicagel 60A 40-63 um produced by Fluorochem LC301 SP.

Preferably the porous support material has the following typical properties;
pores having a diameter ranging from 7.5 to 30 nm;
porosity ranging from 1 to 4 $cm^3/g$;
specific surface area is not particularly limited, it typically ranges between 5 to 250 $m^2/g$; and
an average particle diameter ranging from 1 to 150 µm.

The nature of the support has an influence on the binding strength between support and adsorbed material. It can be complex such as celite or bentonite and have little binding strength. Alternatively it can be an acidic or neutral or basic alumina and offer strong binding. The support is thus selected or tailored according to the desired level of separation or according to the nature of the material to be separated. It is observed for example, that moving from neutral to acidic alumina support results in a shift in fraction distribution towards more polar fractions and greater support interaction.

The starting hop oil material is obtained from commercial suppliers. As they vary in flavour content, they need to be profiled. The hydrocarbons, esters, ketones and alcohols are known to vary from one hop oil to another according to the hop variety selected. The principle hop oil components are terpene hydrocarbons particularly myrcene, humulene and caryophyllene.

Figure 2:
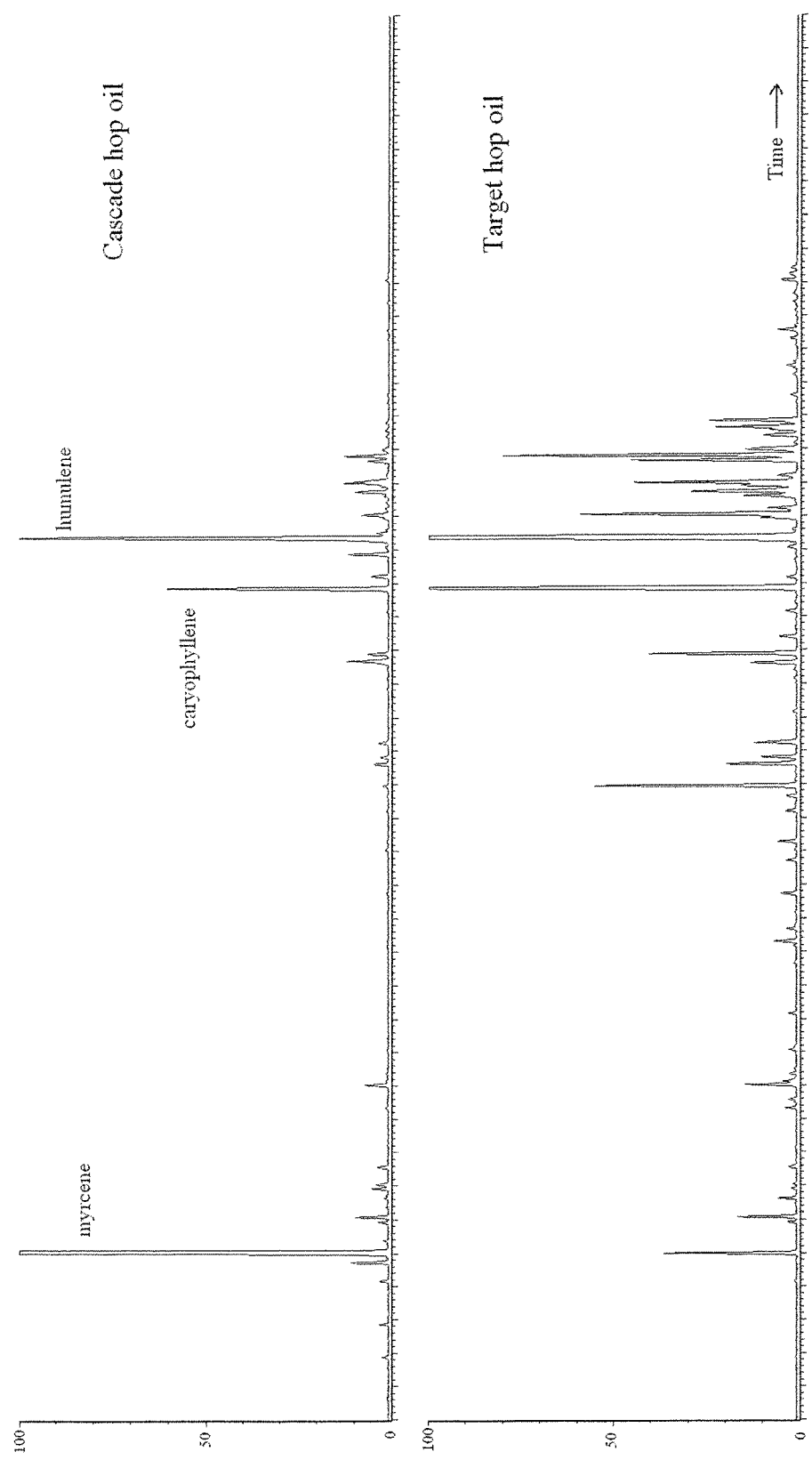
FIG. 2 represents the chromatograms of several starting hop oils

FIG. 2 represents the chromatograms of several starting hop oils.

The support is loaded with hop oil at a loading rate ranging between 1 and 70 mass %, preferably between 1 and 30 mass %, and more preferably between 5 and 20 mass %.

The liquid carbon dioxide used in the first separation is preferably used at a temperature ranging between 3° C. and 7° C., at a pressure ranging between 60 and 70 bars with a preferred flow rate of 1 g and 400 g/kg supported material/min and a period of time ranging between 45 minutes and 1 hour.

For the subsequent separations using carbon dioxide, the temperature and pressure are selected to separate the desired aroma, using increasingly polar conditions.

The liquid CO2 fraction however varies in behaviour depending upon the proportion of mono- and sesquiterpene hydrocarbons in the starting hop oil.

Above the supercritical point, the temperature and pressure are selected and adjusted to fractionate a wide range of molecules.

The supercritical carbon dioxide can further include a percentage of co-solvent, preferably selected from ethanol. This leads to distinct different separation products. The percentage of added co-solvent ranges between 0.05 and 100 vol %, preferably between 0.05 and 40 vol %, and more preferably between 1 and 20 vol %.

Another advantage of using supercritical carbon dioxide as fractionation and extraction solvent is that it can be easily removed because of its 'zero' surface tension, thereby producing solvent-free products.

The 'green' solvents are selected from water, ethanol and carbon dioxide.

The present invention also discloses the flavour products obtained by the method of the present invention. Because the present flavour products have been obtained without solvents they do not suffer the disadvantage of containing traces of solvents.

The present invention further covers the beer products prepared with the flavour products of the present invention. In addition to being fully 'green', they have a distinct 'clean' flavour.

EXAMPLES

Hop oils (Target SD, Target MD, Cascade SD, Magnum (MD), AOE Stage 1 (MD) and AOE Stage 2 (MD) were provided by TNS Ltd. Neutral alumina, acidic alumina and silica were obtained from Sigma-Aldrich, silicagel 60A 40-63 um was obtained from Fluorochem LC301 SP, and liquid $CO_2$ was obtained from BOC. The ethanol used was fermentation grade absolute ethanol obtained from Fisher.

Extraction trials were carried out on a Thar SFC-1000 extraction rig, an initial extraction was carried out using a 100 ml extractor but all subsequent trials were made using a 1000 ml extractor to improve fraction yield and accuracy.

The support was prepared as follows: 900 g mineral support were weighed into a 2000 ml rotary evaporator flask, 100 g hop oil were added in 10 g portions, rotating the flask in between additions to completely disperse the oil and the flask was rotated slowly until a free flowing powder was obtained.

Extraction was then carried out as follows: the chillers were set at a temperature of 0° C. for the $CO_2$ pump and at a temperature of +5° C. for the cold trap. 1 kg of the supported hop oil was loaded into the 1000 ml extractor, the powder was fluidised using a long spatula to compact the charge and all powder was removed from the inner rim and threads before closing the extractor. The cylinder inlet pressure was set to 50-52 bar using manual back pressure regulator (BPR) on $CO_2$ inlet line, the inline heater and extractor 1 were switched off and the separator was heated to 35° C.

The first extraction was carried out with liquid $CO_2$ at room temperature (25° C.) and 70 bar with a flow rate of 15 g/min. Once pressure had been reached, the separator was adjusted to 15 bar back pressure and samples were collected every 15 minute, until the 15 min fraction weight was below 1 g. When the last sample was collected, the cold trap was drained. After completion, the $CO_2$ pump was switched off, the separator back pressure was released and the separator and cold trap were washed with industrial methylated spirits (IMS), washings were discarded. The lid was refitted and tightened after thorough drying In the subsequent extraction using Supercritical $CO_2$, the automated back pressure regulator (ABPR) was set to 400 bar and the extractor temperature was increased to 50° C. Once temperature was reached, $CO_2$ was turned on at a flow rate of 15 g/minute and once the pressure had been reached the separator was adjusted to 15 bar back pressure and the separator fraction was collected after 60 minutes. When complete the $CO_2$ pump was switched off, the back pressure was released and the separator washed out with IMS. The washings were discarded, trap volatiles were collected in a separate vial, then the trap was opened and washed out with IMS and the washings were discarded. The trap and separator were reassembled.

The next extraction was carried out with supercritical $CO_2$ with ethanol as co-solvent. The co-solvent pump was primed, then the valve was slowly opened to allow pressure to equilibrate with scCO$_2$ flow. ABPR setting was slowly reduced to 300 bar and the extractor temperature decreased to 40° C. Once temperature had been reached, $CO_2$ flow was turned on at a flow rate of 18 g/minute and once pressure had been reached, the separator was adjusted to 15 bar back pressure and the co-solvent pump was opened at a flow rate of 2 g/minute ethanol corresponding to 10 vol %. The samples were collected every hour for 3 hours but the separator and trap were drained every 30 minutes into the same flask. After 3 hours the co-solvent pump was turned off but the $CO_2$ pump was run for another 30 minutes adding this to the last fraction.

At the end of the operation the plant was thoroughly cleaned as follows: the plant was depressurised and all heaters turned off. The contents of extractor were emptied into a plastic beaker and the extractor was cleaned with a vacuum cleaner. The trap and separator were cleaned with IMS, and allowed to dry. The plant was then reassembled.

A typical extraction profile can be seen in FIG. 1 wherein it can be seen that each fraction peak elutes over a given time period.

Identification of the compounds was based on calculated Kovats retention index, comparison with library mass spectra (NIST and Adams) and comparison with standard components. The use of a VF-5 (equivalent to DB-5 or HP-5) column allowed more accurate correlation with the extensive Adams database. Infrared spectra were also obtained on all the liquid $CO_2$ and supercritical $CO_2$ fractions using a Nicolet 8700 FT-IR fitted with a diamond cell. Scans were averaged from thirty two scans.

Example 1

The trials were carried out with Target hop oil (SD) at room temperature with alumina support supplied by TNS. This is a heat activated basic alumina supplied by Rockwood.

Figure 3:
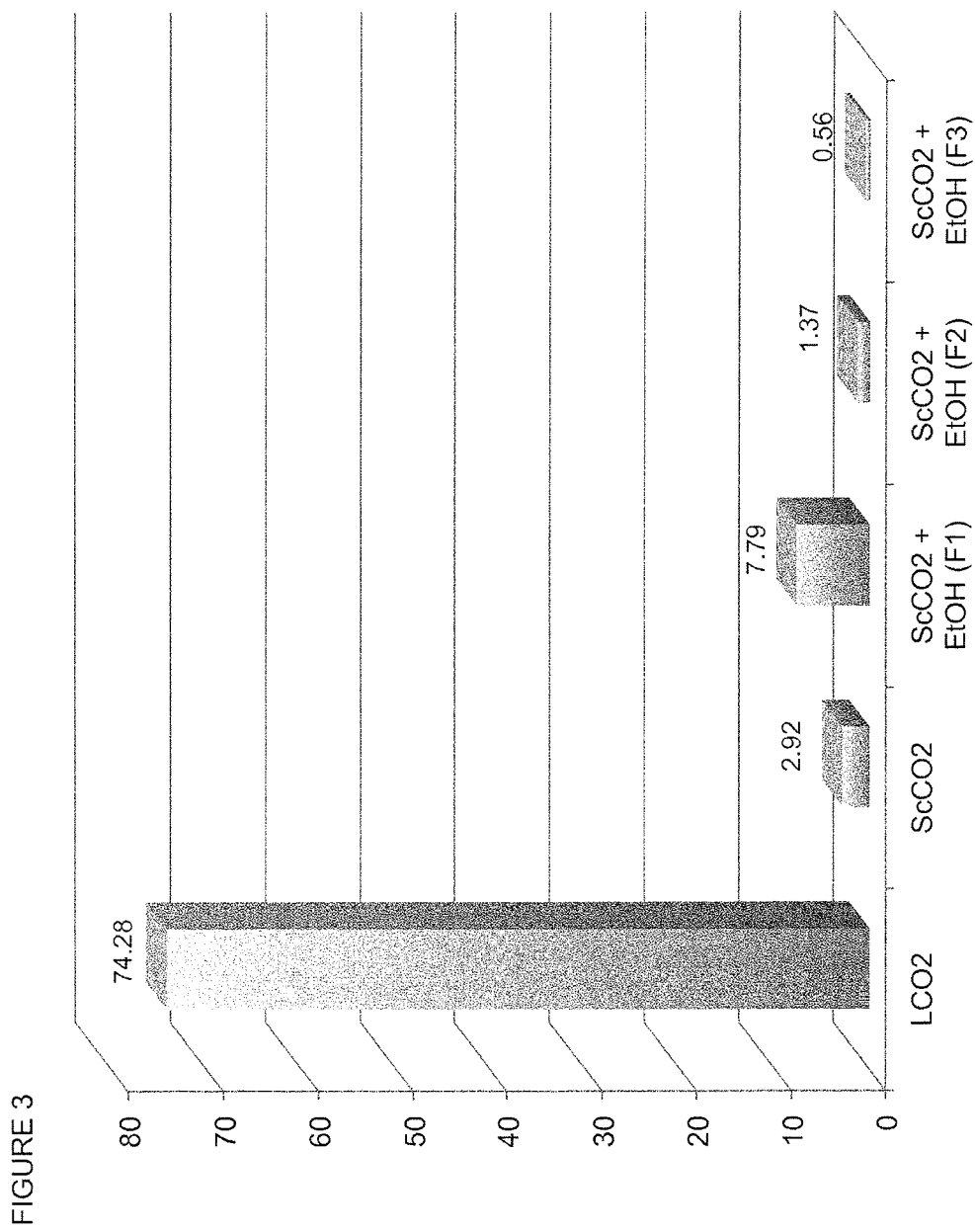
FIG. 3 represents the yield expressed in g for various fractions for Target hop oil (SD) with a separation carried out at room temperature with alumina support.

The separated fractions are shown in FIG. 3 and the separated flavours are described here below.

Liquid carbon dioxide separation.

Figure 4:
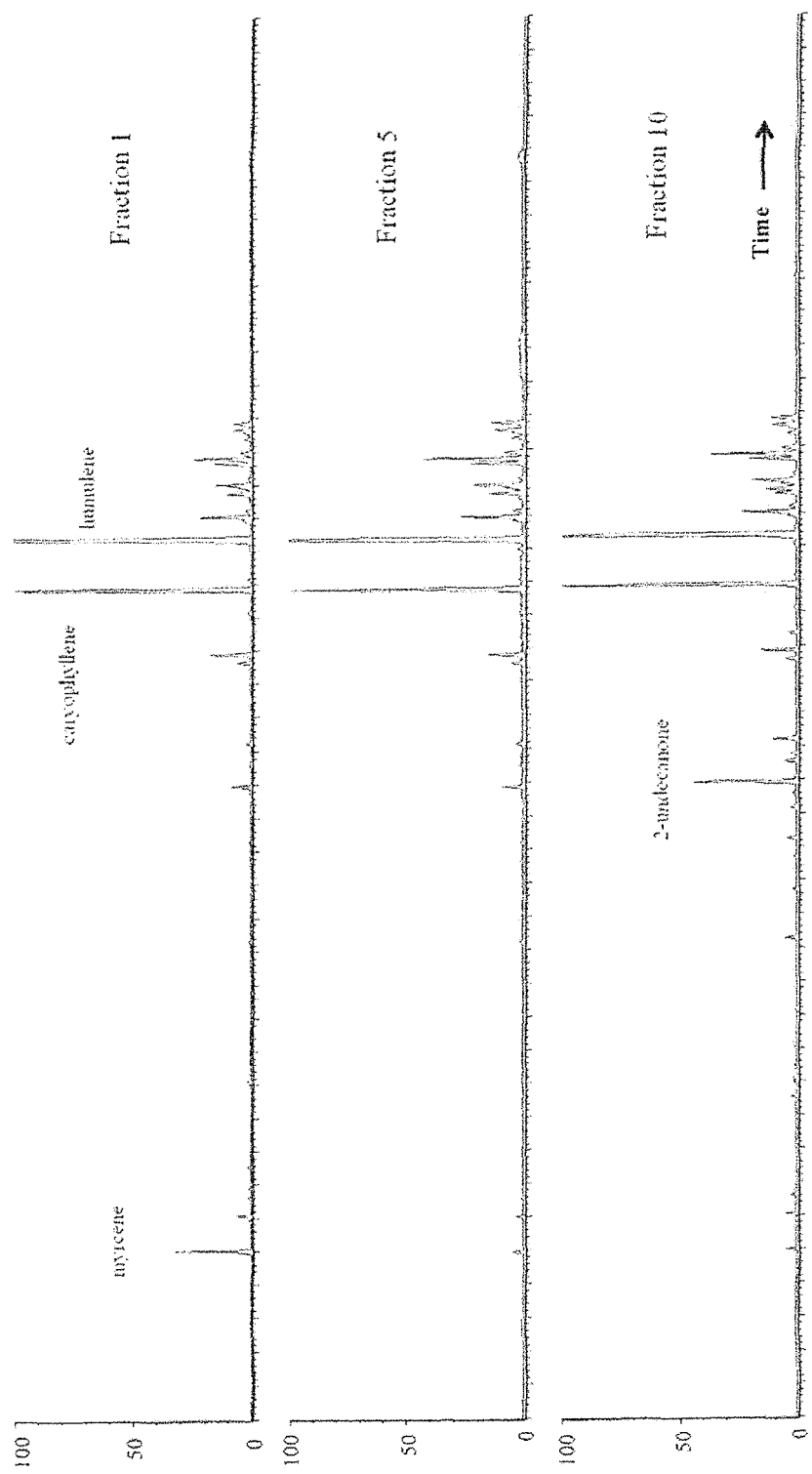
FIG. 4 shows the chromatograms of liquid $CO_2$ fractions 1, 5 and 10 for target hop oil (SD) at room temperature on alumina support.
Figure 5:
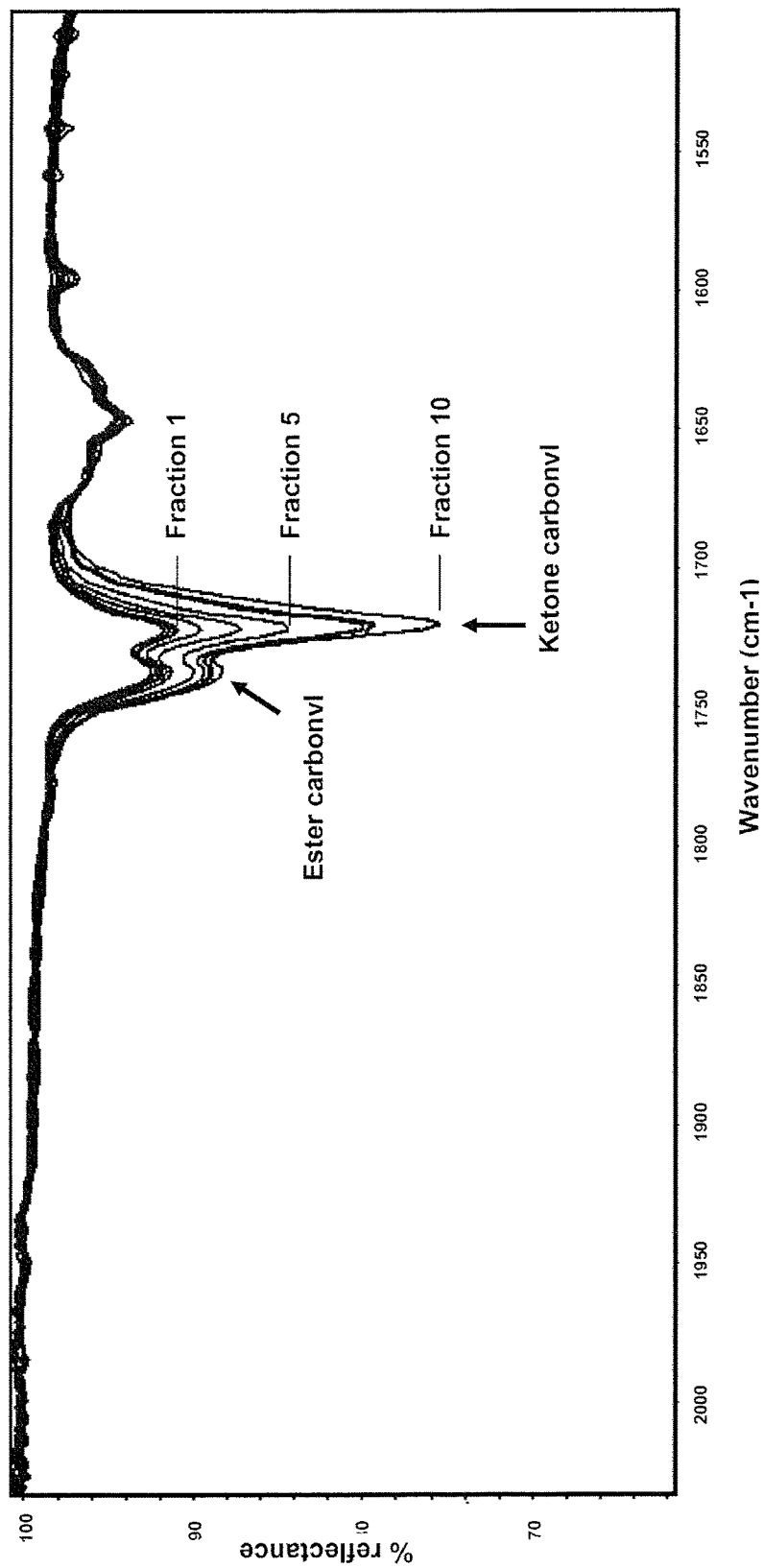
FIG. 5 represents FT-IR analysis for selected fractions of target hop oil (SD) at room temperature on alumina support.

FIG. 4 shows the chromatograms of the first, middle and last liquid $CO_2$ fractions and it shows that towards the end of the liquid carbon dioxide extraction, 2-undecanone was beginning to be eluted. This trend is confirmed by the FT-IR analysis represented in FIG. 5, which shows an increasing carbonyl stretch at 1725 cm$^{-1}$ from the ketones against a decreasing ester carbonyl stretch at 1740 cm$^{-1}$. The liquid $CO_2$ fraction varies in behaviour depending on the proportion of mono and sesquiterpene hydrocarbons in the oil with variable amounts being recovered in the separator or in the cold trap.

Figure 6:
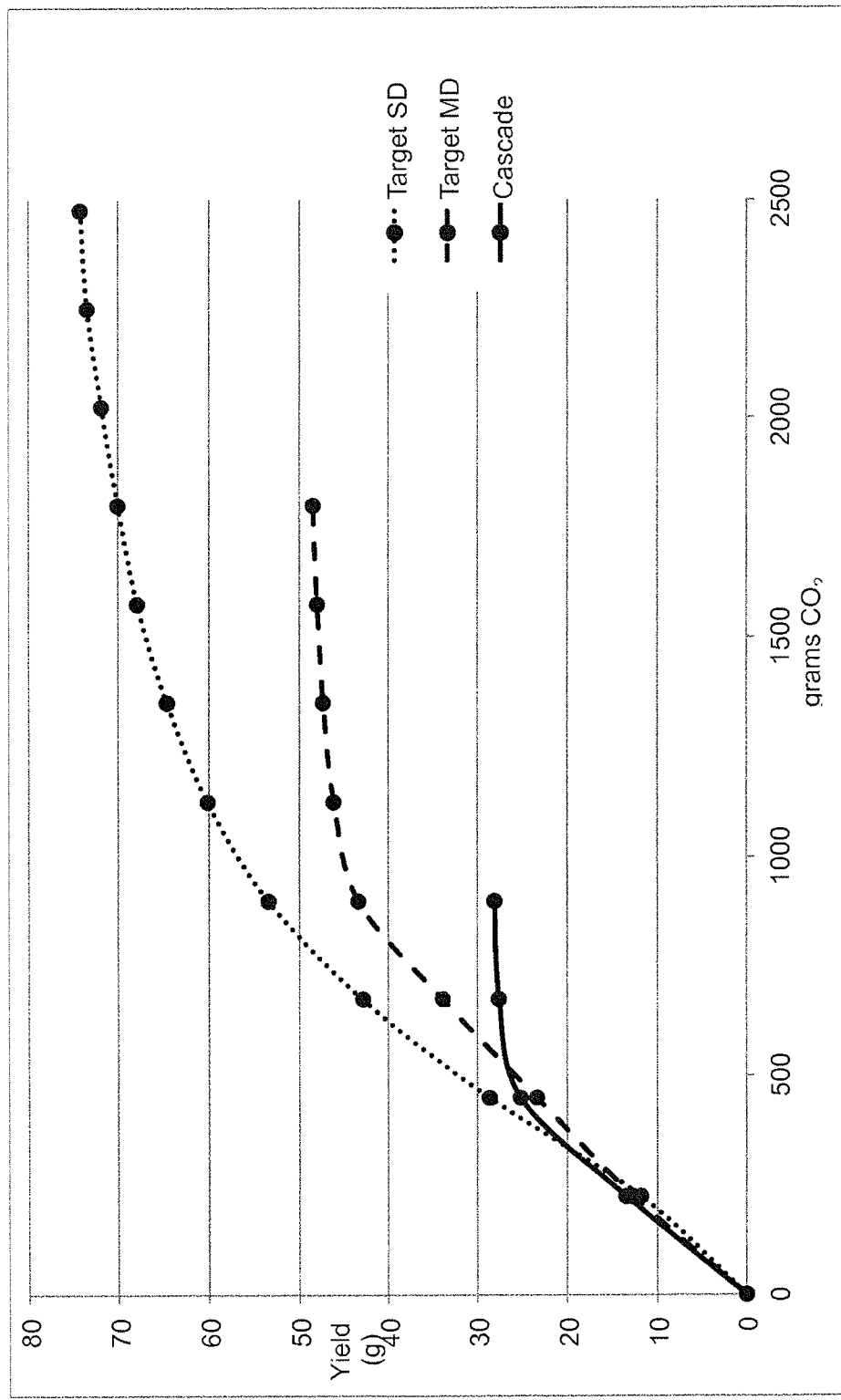
FIG. 6 represents the yield expressed in grams as a function of liquid $CO_2$ used expressed in grams for 3 different starting hop oils.

FIG. 6, which represents a graph of yield as a function of amount of $CO_2$ for various starting hop oils, clearly shows that every oil must be processed for a different time according to its composition.

Supercritical carbon dioxide separation.

The supercritical $CO_2$ fraction is mainly composed of ketones with some residual caryophyllene and humulene and the FT-IR spectra shows this to have an almost pure ketone carbonyl stretch. This fraction appears to have the organoleptic characteristics of a floral fraction.

Supercritical carbon dioxide with 10 vol % ethanol separation.

The supercritical $CO_2$ fractions with 10% ethanol added were distinctly different. The first and second fractions were mainly composed of linalol and 2-humulenol with some 2-undecanone and had a distinct hop spicy character. The third fraction contained much higher levels of free fatty acids and had a noticeable acidic aroma.

Example 2

The same separation scheme as that of example 1 was repeated using a lower temperature of 10° C. instead of room temperature.

Figure 7:
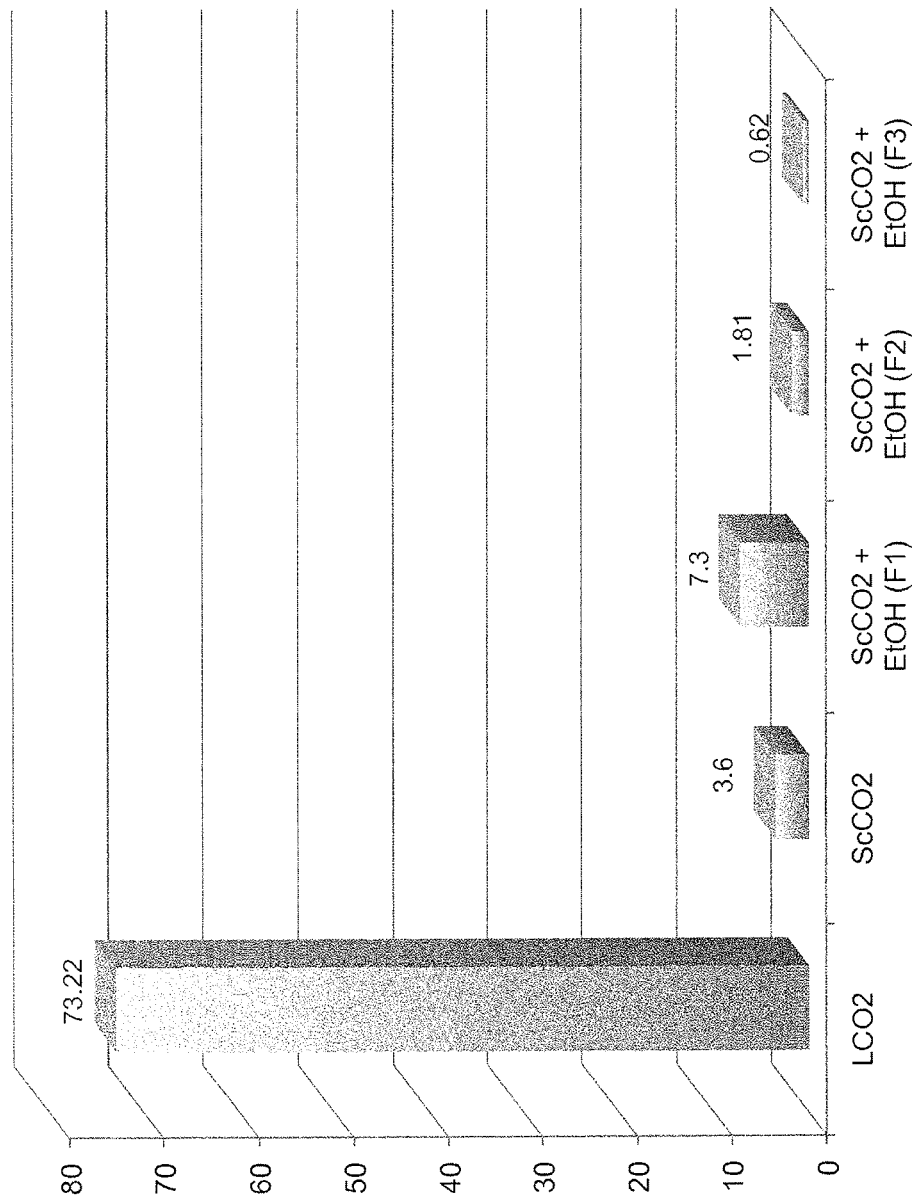
FIG. 7 represents the yield expressed in grams for various fractions for Target hop oil (SD) with a separation carried out at a temperature of 10° C. with alumina support.
Figure 8:
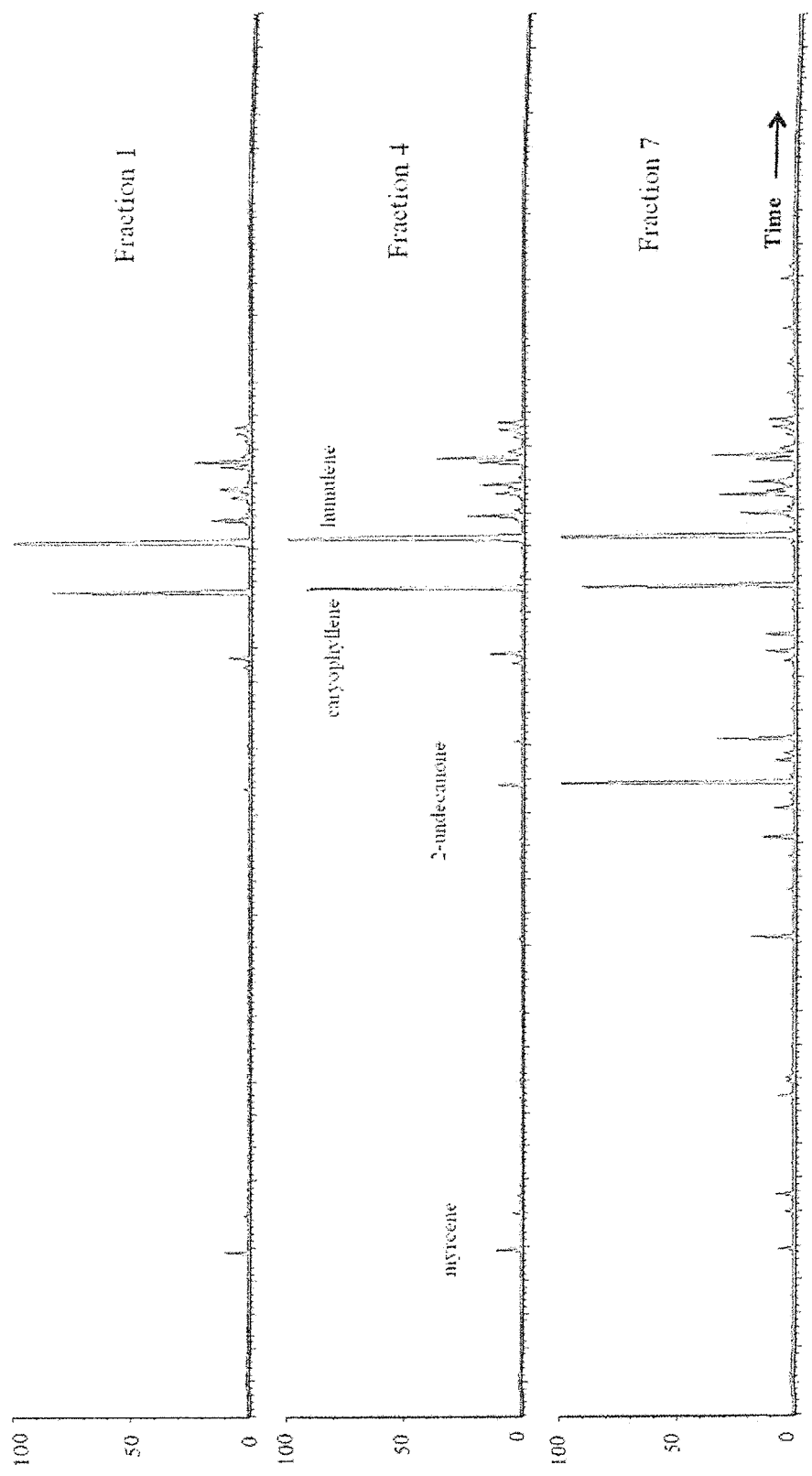
FIG. 8 represents the chromatograms of liquid $CO_2$ fractions 1, 4 and 7 for target hop oil (SD), on alumina support and at a temperature of 10° C.

The fraction yields were almost identical to those of example 1 but the $scCO_2$ fraction was higher as can be seen in FIG. 7. The chromatograms of each fraction showed that the distribution of the ketones was significantly changed as seen for example in FIG. 8. There was less 2-undecanone in the liquid $CO_2$ fractions and the $scCO_2$ fraction was much richer in ketones with less humulene and caryophyllene. The $scCO_2$ fractions+ethanol were similar to those obtained at room temperature but less fatty acids were extracted. Without wishing to be bound by a theory, it is assumed that the $CO_2$ is behaving as a less polar solvent at lower temperatures and it might thus be preferable to carry out the separation at 10° C. The $scCO_2$+ethanol fractions from both Target hop oil trials had an overall spicy character but when aired off on a smelling strip a noticeable citrussy character emerges.

Example 3

Examples 1 and 2 were all carried out using the alumina supplied by TNS. This is a heat activated basic alumina supplied by Rockwood. In this example, the support was neutral alumina supplied by Sigma-Aldrich and with a particle size distribution almost identical to that of the Rockwood alumina.

Figure 9:
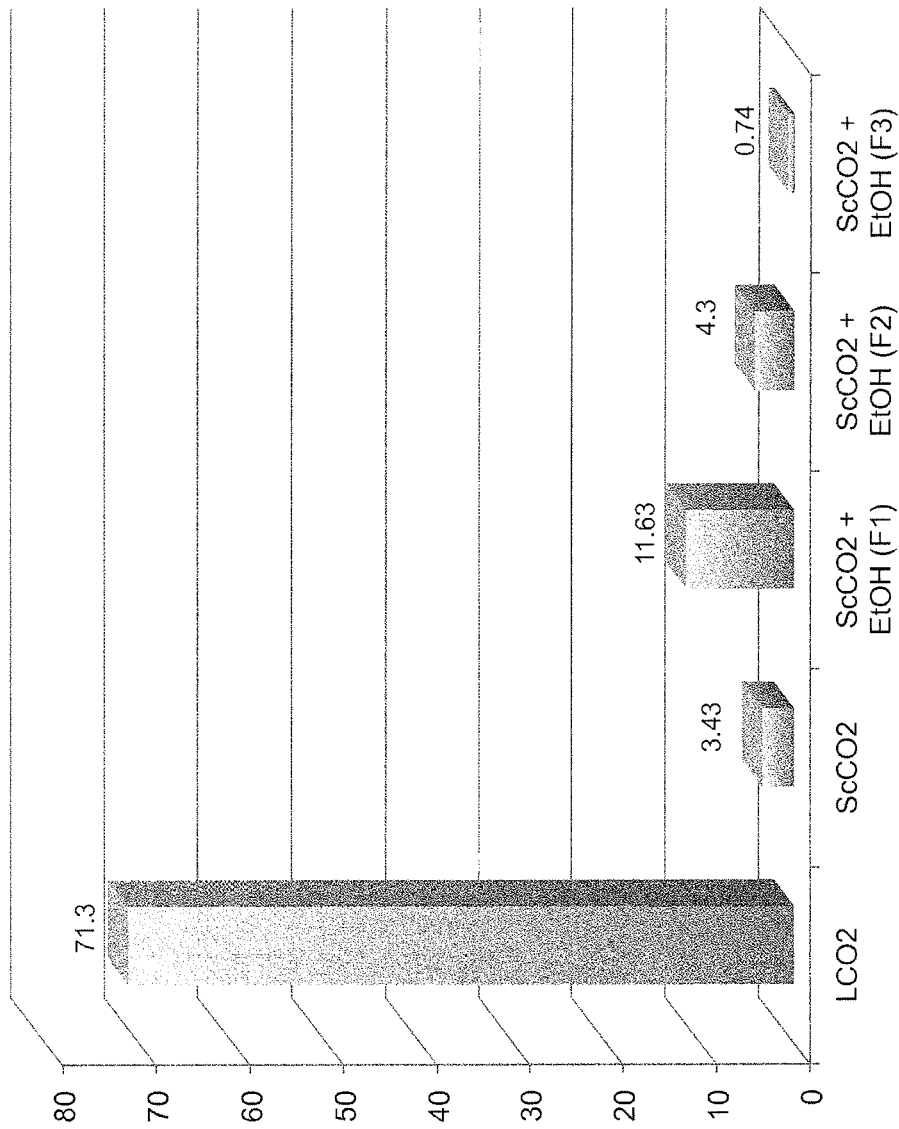
FIG. 9 represents the yield expressed in grams for various fractions for Target hop oil (SD) with a separation carried out at room temperature with neutral alumina support.

The use of this support produced fractions with slightly higher $scCO_2$ and $scCO_2$+ethanol yields than those of examples 1 and 2 as can be seen in FIG. 9. It may be associated with a greater retention of the support.

Figure 10:
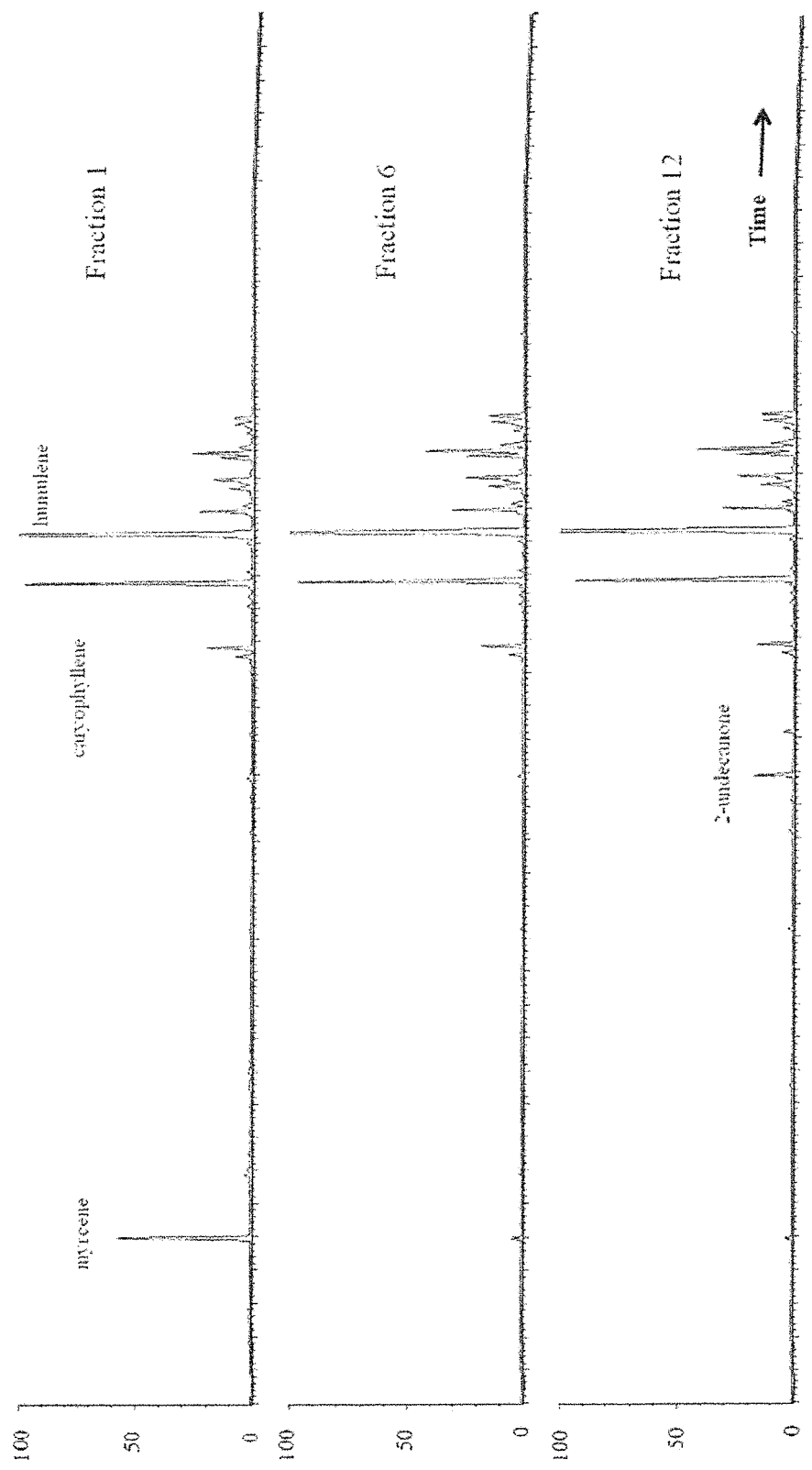
FIG. 10 represents the chromatograms of liquid $CO_2$ fractions 1, 6 and 12 for target hop oil SD at room temperature on neutral alumina support.

The chromatograms showed that the liquid $CO_2$ was removing much less 2-undecanone even in the later fractions, as seen for example in FIG. 10.

Increasing the pressure to supercritical $CO_2$ started to remove the 2-undecanone but this fraction still contained high levels of sesquiterpene hydrocarbons. The further addition of ethanol still gave fractions that were rich in 2-undecanone with the linalol being retained on the support.

Example 4

Figure 11:
FIG. 11 represents the yield expressed in grams for various fractions for Target hop oil (SD) with a separation carried out at room temperature with acidic alumina support.

The neutral alumina support was replaced by acidic alumina. This resulted in a further shift in fraction distribution towards more polar fractions and greater support interaction as seen in FIG. 11.

Figure 12:
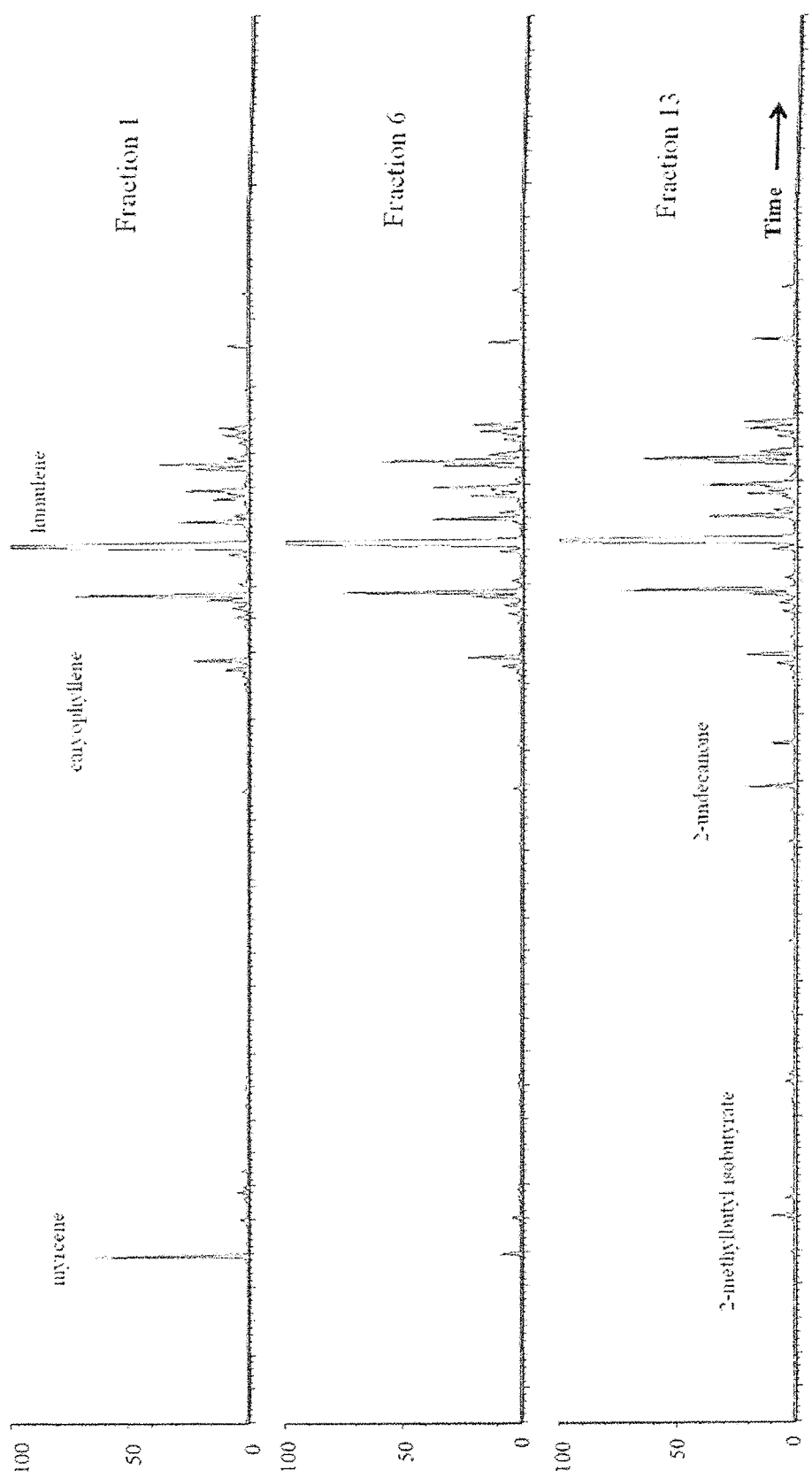
FIG. 12 represents the chromatograms of liquid $CO_2$ fractions 1, 6 and 13 for target hop oil SD at room temperature on acidic alumina support.

The chromatograms showed that the liquid $CO_2$ was removing almost no 2-undecanone even in the later fractions. Increasing the pressure to supercritical $CO_2$ started to remove the ketones but this fraction still contained high levels of sesquiterpene hydrocarbons as seen for example in FIG. 12. The addition of ethanol gave fractions that were still rich in 2-undecanone with the linalol being almost completely retained on the support.

Example 5

Silica support was used in this series of trials. This support appears to be behaving as a highly acidic material but is actually a neutral material having a pH of 6.7 in a 10% solution.

Figure 13:
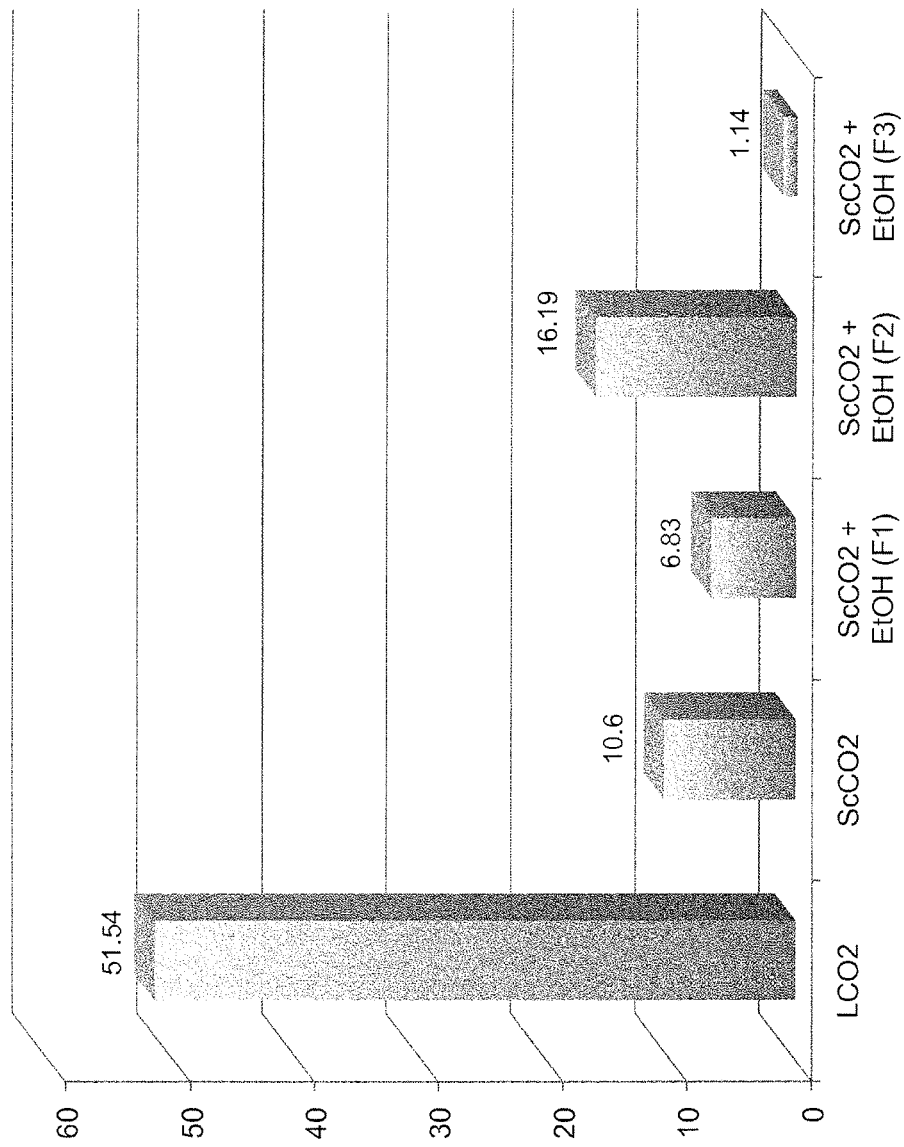
FIG. 13 represents the yield expressed in grams for various fractions for Target hop oil (SD) with a separation carried out at room temperature with silica support.
Figure 14:
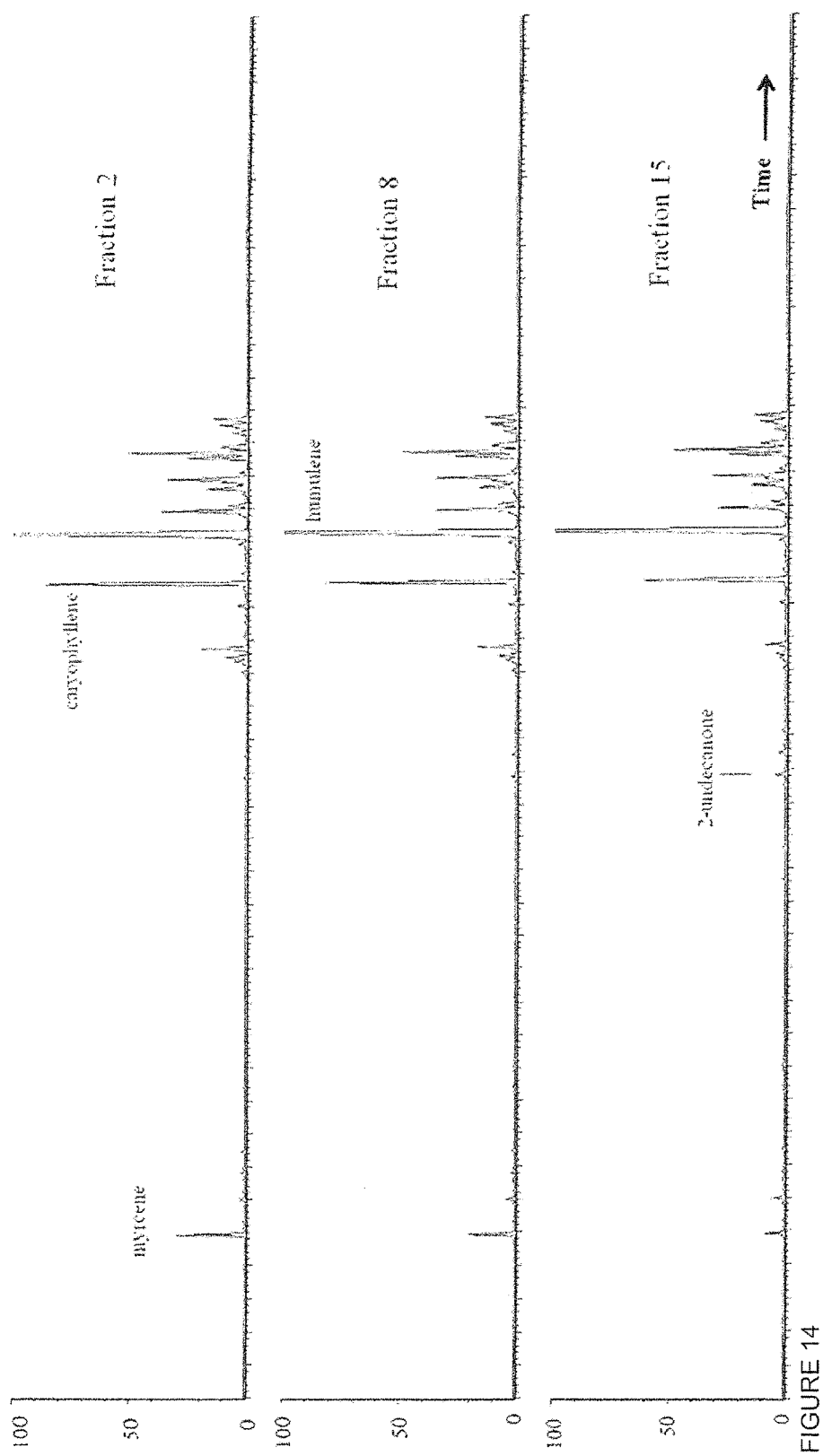
FIG. 14 represents the chromatograms of liquid $CO_2$ fractions 2, 8 and 15 for target hop oil SD at room temperature on silica support.

In this trial there was a further shift toward more polar fractions with greater yields both with $scCO_2$ and $scCO_2$+ethanol particularly in the second co-solvent fraction as seen in FIG. 13. The chromatograms showed that both the liquid $CO_2$ and $scCO_2$ were removing almost no 2-undecanone as seen for example in FIG. 14. With the addition of the ethanol, a significant level of ketones was removed only after the second fraction and the linalol was almost completely retained on the support.

Example 6

Figure 15:
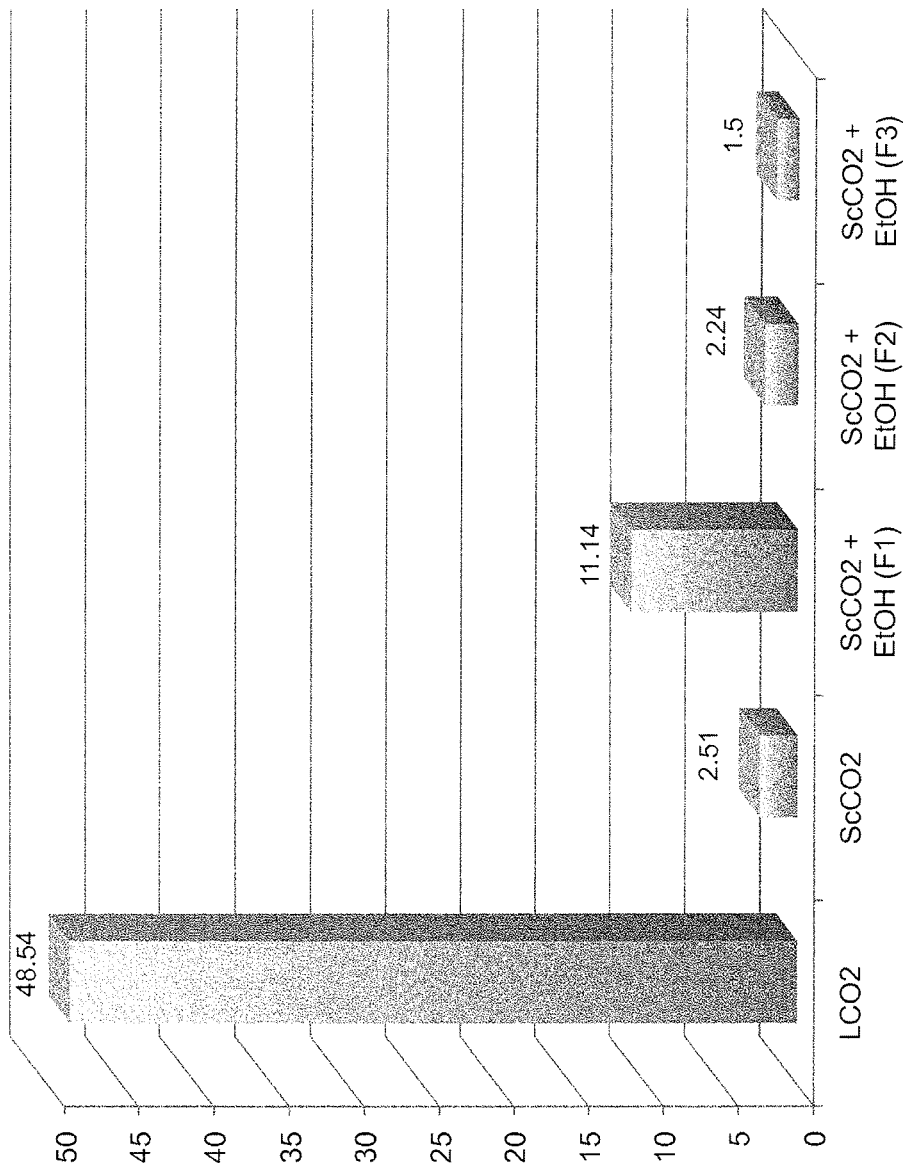
FIG. 15 represents the yield expressed in grams for various fractions for Target hop oil (MD) with a separation carried out at room temperature with basic alumina support.

This trial was carried out using heat treated basic alumina (Rockwood) using Target hop oil (MD). It behaved in a similar way to Target hop oil (SD) but had an overall lower yield as can be seen in FIG. 15.

The chromatograms of the first, middle and last liquid $CO_2$ fractions indicated that towards the end of the liquid $CO_2$ extraction, 2-undecanone and 2-tridecanone were becoming the predominant components. The supercritical $CO_2$ fraction was mainly composed of ketones but linalool was also present. The supercritical $CO_2$ fraction with 10% ethanol added was collected as three one-hour fractions. These were distinctly different: the first fraction was mainly composed of linalol and 2-humulenol but both the second and third fractions had significant levels of fatty acids. It is believed that the separation could be improved by running this oil at a lower temperature as was observed in the Target hop oil (SD) of example 2.

Example 7

Figure 16:
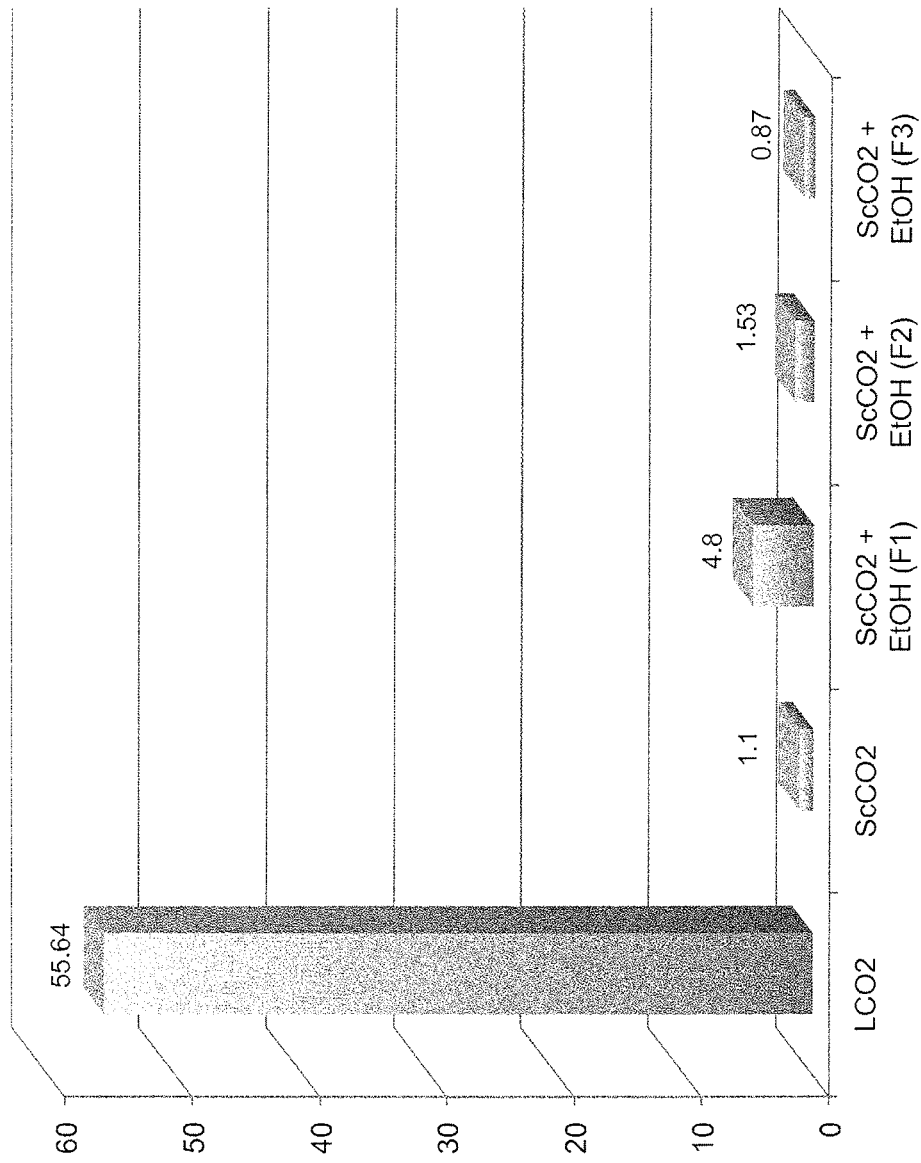
FIG. 16 represents the yield expressed in grams for various fractions for Cascade hop oil (SD) with a separation carried out at room temperature with basic alumina support.

Cascade hop oil (SD) was used in this trial. It also appears to have a significant amount of polymerised material as the overall yield was only 63% of the starting weight. The fraction distribution also showed low yields of both the $scCO_2$ and $scCO_2$+ethanol fractions as can be seen in FIG. 16. They had however very intense aroma.

The chromatograms for the Cascade fractions showed that the liquid $CO_2$ fractions comprised almost entirely hydrocarbons. The supercritical $CO_2$ fraction had an intense rose/floral aroma probably attributed to the high level of methyl geranate. The $scCO_2$+ethanol fractions were predominantly linalool and geraniol and again had an intense floral aroma. The last $scCO_2$+ethanol fraction had high levels of fatty acids including geranic acid and was therefore a potential precursor fraction to produce more methyl geranate.

Example 8

Figure 17:
FIG. 17 represents the yield expressed in grams for various fractions for Magnum hop oil (MD) with a separation carried out at room temperature with silicagel 60A 40-63 um support and with a high loading of hop oil onto the support.

This trial was carried out using silicagel 60A 40-63 um (Fluorochem LC301 SP) and Magnum hop oil (MD). In this example a significantly higher oil loading is demonstrated with 460 g Magnum hop oil being coated onto 500 g of silica. The extraction followed a pattern of yields similar to that of the preceding examples carried out with a lower oil loading as can be seen in FIG. 17. The chromatograms of the liquid $CO_2$ fractions indicated that the composition was almost entirely terpene hydrocarbons with low levels of esters, such as methyl-4-decenoate towards the end of the liquid $CO_2$ extraction. The supercritical $CO_2$ fraction was mainly composed of ketones but a low level of linalool was also present. The supercritical $CO_2$ fraction with 10% ethanol added was collected as three one-hour fractions. These were all similar and mainly composed of linalool and 2-humulenol with other mono and sesquiterpene alcohols present. Although this example produced fractions that had very distinctive organoleptic properties the separation between the hydrocarbons, esters, ketones and alcohols was not as sharp as that of examples 1 to 7 carried out with lower oil loading.

What is claimed:

1. A method for extracting two or more fractions from hop oil, said method comprising the steps of:
   a) providing an inert adsorbing support;
   b) after step a), loading the hop oil onto the support of step a) at a loading rate ranging between 1 and 70 mass %;
   c) after step b), separating a first fraction with liquid carbon dioxide at a first temperature ranging between 0° C. and 30° C. and a first pressure ranging between 40 bars and 72.8 bars and a first flow rate ranging between 1 g and 400 g/kg supported material/min;
   d) after step c), separating a second fraction with supercritical carbon dioxide at a second temperature ranging between 31° C. and 80° C. and a second pressure of at least 72.8 bars, and a second flow rate ranging between 1 g and 400 g/kg supported material/min;
   e) after step d), separating a further fraction or a new fraction with supercritical carbon dioxide at a temperature of at least 31° C. and a pressure of at least 72.8 bars and a flow rate ranging between 1 g and 400 g/kg supported material/min using a co-solvent at a level ranging between 0.05 vol % and 100 vol % of the $CO_2$ flowrate;
   f) soaking the support resulting from step e) into a solvent selected from a group consisting of water, ethanol, and carbon dioxide obtained from biological and sustainable sources; and
   g) decanting or filtering the solvent from the support and subsequently evaporating or distilling said solvent.

2. The method of claim 1 wherein the inert adsorbing supports can be neutral, or basic or acidic.

3. The method of claim 2 wherein the support is selected from the group consisting of silica, alumina, montmonrillionite, magnesium silicate, aluminium silicate, zeolite, polystyrene beads, chitosan, and polysaccharides.

4. The method of claim 1 wherein the loading rate of the support with the hop oil ranges between 1 and 30 mass %.

5. The method of claim 4 wherein the loading rate of the support with the hop oil ranges between 5 and 20 mass %.

6. The method of claim 1 wherein in step c) the first temperature is ranging between 3° C. and 7° C., and the first pressure is ranging between 60 and 70 bars.

7. The method of claim 1 wherein the second pressure is of at most 700 bars.

8. The method of claim 1 wherein the co-solvent is ethanol used in an amount ranging between 1 and 20 vol %.

\* \* \* \* \*